(12) United States Patent
Painter (10) Patent No.: US 9,662,847 B2
(45) Date of Patent: May 30, 2017

(54) TIRE BUILDING DRUM HAVING SEQUENCED SEGMENT EXPANSION

(71) Applicant: Davian Enterprises, LLC, Greenback, TN (US)

(72) Inventor: Brian Painter, Walsall (GB)

(73) Assignee: Davian Enterprises, LLC, Greenback, TN (US)

( * ) Notice: Subject to any disclaimer, the term of this patent is extended or adjusted under 35 U.S.C. 154(b) by 517 days.

(21) Appl. No.: 14/171,067

(22) Filed: Feb. 3, 2014

(65) Prior Publication Data
US 2014/0144588 A1 May 29, 2014

Related U.S. Application Data

(63) Continuation-in-part of application No. 11/887,189, filed as application No. PCT/GB2006/001156 on Mar. 30, 2006, now abandoned.

(51) Int. Cl.
*B29D 30/24* (2006.01)
*B29D 30/26* (2006.01)

(52) U.S. Cl.
CPC ............. *B29D 30/26* (2013.01); *B29D 30/24* (2013.01); *B29D 30/245* (2013.01)

(58) Field of Classification Search
CPC ........ B29D 30/12; B29D 30/24; B29D 30/36; B29D 30/245; B29D 2030/2635
See application file for complete search history.

(56) References Cited

U.S. PATENT DOCUMENTS

| | | | |
|---|---|---|---|
| 1,233,567 A | 7/1917 | Furry |
| 1,750,728 A | 3/1930 | Robison |
| 2,168,897 A | 8/1939 | Bostwick |
| 2,201,469 A | 5/1940 | Bostwick |
| RE22,369 E | 8/1943 | Bostwick |
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |

(Continued)

FOREIGN PATENT DOCUMENTS

| | | |
|---|---|---|
| CA | 2188639 | 10/1996 |
| CA | 2219387 | 10/1997 |

(Continued)

*Primary Examiner* — Geoffrey L Knable
(74) *Attorney, Agent, or Firm* — Pitts & Lake, P.C.

(57) ABSTRACT

A tire building drum is disclosed having first and second sets of deck segments, disposed in an alternating configuration about a central shaft. Each of the segments is mounted to a pair of axially movable hub units via an associated scissor linkage. The scissor linkages of the first segments are slidably mounted to the hub units and biased toward a median plane of the tire building drum. When the hub units are separated, the second segments are disposed radially inwardly of and between the first segments. Movement of the hub units toward one another through a first range of motion expands the first deck segments to an expanded diameter of the drum, and movement of the hub units toward one another through a second range of motion expands the second deck segments to allow the second deck segments to be received between the first deck segments.

15 Claims, 7 Drawing Sheets

(56) References Cited

U.S. PATENT DOCUMENTS

| | | |
|---|---|---|
| 2,603,581 A * | 7/1952 | Ericson ............... B29D 30/248 156/415 |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Pouilloux |
| 3,111,445 A | 11/1963 | Pouilloux et al. |
| 3,140,216 A | 7/1964 | Shills et al. |
| 3,207,648 A | 9/1965 | Shills |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,644,162 A | 2/1972 | Appleby et al. |
| 3,654,025 A * | 4/1972 | Winzer ............... B29D 30/245 156/415 |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,505,803 A | 4/1996 | Byerley |
| 5,558,733 A | 9/1996 | Byerley |
| 5,618,374 A | 4/1997 | Byerley |
| 5,635,016 A | 6/1997 | Byerley |
| 5,709,768 A | 1/1998 | Byerley |
| 5,735,995 A | 4/1998 | Bull et al. |
| 5,755,922 A | 5/1998 | Baldoni et al. |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,390,166 B1 | 5/2002 | Roberts et al. |
| 6,457,505 B1 | 10/2002 | Byerley |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 2003/0197389 A1 | 10/2003 | Moilanen et al. |
| 2008/0202690 A1 | 8/2008 | Painter |
| 2009/0056879 A1 | 3/2009 | Painter |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |

FOREIGN PATENT DOCUMENTS

| | | |
|---|---|---|
| CA | 2142004 | 4/2006 |
| DE | 19913241 | 9/2000 |
| DE | 102009025759 | 11/2010 |
| MX | 200554 | 1/2001 |
| WO | WO 01/07242 | 2/2001 |
| WO | WO 2006/103434 | 10/2006 |
| WO | WO 2011/159343 | 12/2011 |
| WO | WO 2012/031193 | 3/2012 |

* cited by examiner

TIRE BUILDING DRUM HAVING SEQUENCED SEGMENT EXPANSION

CROSS-REFERENCE TO RELATED APPLICATIONS

This application is a continuation-in-part of U.S. patent application Ser. No. 11/887,189, filed Oct. 29, 2008, which claims the benefit of International Application No. PCT/GB2006/001156, filed Mar. 30, 2006, which claims the benefits of GB 0506363.1 filed Mar. 30, 2005.

STATEMENT REGARDING FEDERALLY-SPONSORED RESEARCH OR DEVELOPMENT

Not Applicable

BACKGROUND OF THE INVENTION

1. Field of Invention

This invention relates to tire building drums, and more specifically, to a tire building drum incorporating an expandable and collapsible cylindrical deck upon which a tire or part of a tire carcass may be formed.

2. Description of the Related Art

Tires, such as for example radial automotive tires of the type having an inner liner, a plurality of body plies, sidewalls, and a plurality of beads disposed proximate an inner circumference of the tire, are known in the art. It is understood generally that in traditional tire manufacture, following initial preparation of various components to be used, a generally cylindrical tire carcass is built through a process of assembling various components of a tire onto one or more tire building drums. Such tire carcasses normally include tire components such as multiple plies of tire bands, yarns, and one or more annular reinforcing tire beads at opposite ends of the tire bands. Thereafter, the tire carcass is expanded to a toroidal shape with the plies of tire bands forming an outer circumference of the toroid and the tire beads forming inner circumferences of the toroid. Often additional material is added to the tire carcass to form an uncured or "green" tire. The green tire is then formed into a desired finished geometry and cured, often through a process commonly known as "vulcanization," to allow the tire to retain the finished geometry. For convenience herein, reference will be made simply to "tire building" and to a "tire," it being understood that these terms are intended to embrace the construction of sub-assemblies such as a tire carcass, belt and tread package, etc.

One apparatus and method useful in expanding a tire carcass to a toroidal shape is a tire shaping drum of the type discussed in U.S. Pat. No. 4,325,764, issued to Appleby et al. (hereinafter "the '764 patent"). In the '764 patent, a tire carcass is placed over a tire shaping drum having a pair of segmented, radially expandable and contractible annular support structures, each support structure defining a radially expandable and contractible beadlock for establishing a firm frictional connection between the support structure and a reinforcing bead of the tire carcass. The annular support structures defining the beadlocks are adjustably repositionable in relation to one another along an axial dimension of the tire shaping drum to assist both in mating the beadlocks to the reinforcing beads of the tire carcass and in shaping the tire carcass to a toroidal shape. The device of the '764 patent is configured to allow injection of air or other fluid between the tire carcass and a portion of the tire shaping drum between the beadlocks to allow the tire carcass to be expanded to a toroidal shape.

In other tire shaping drums, a plurality of substantially rigid deck segments are provided between the support structures of the tire shaping drums. The deck segments are configured to be radially movable in relation to a central shaft of the tire shaping drum between an expanded position and a collapsed position. In the expanded position, the deck segments are arranged in an end-to-end fashion to define an outwardly facing cylindrical or toroidal working surface defining a desired expanded shape of a tire carcass positioned on the drum. In the collapsed position, the deck segments are positioned in a radially-inwardly collapsed position, thereby allowing an expanded tire carcass to be removed from the tire shaping drum and a new tire carcass to be positioned on the tire shaping drum. The deck segments of the tire shaping drum are carried from a hub rotatable with a main support/drive shaft of the drum. The interconnection between the hub and the deck segments can take a number of forms, but one convenient form utilizes pivoting links which are operated by movement of a drive component of the hub relative to the remainder of the hub to move the links between collapsed and expanded positions carrying the deck segments with them.

It will be recognized that in a conventional drum, in order to ensure that the deck segments are circumferentially aligned in their expanded positions, extreme accuracy in the construction and operation of the link mechanisms and circumferential clearance between deck segment edges are needed. Accordingly, it is difficult to produce such drums with a large range of movement between collapsed and fully expanded positions. Moreover, it is difficult to control the lateral and radial positions of the deck segments, when in their expanded positions, and thus it is difficult to control lateral and radial run-out of the expanded drum. Accordingly, there is a need in the art for a tire building drum in which the aforementioned difficulties are minimized or obviated.

BRIEF SUMMARY OF THE INVENTION

In accordance with a first aspect of the present invention, there is provided a tire building drum comprising a rotatable hub assembly, a plurality of deck segments supported from the hub assembly through the intermediary of respective linkage arrangements for expanding and contracting movement between a collapsed position in which the drum has a relatively small overall diameter and an expanded position in which the deck segments define a cylindrical tire building deck of the drum of significantly larger overall diameter, said deck segments comprising first and second sets of segments, the segments of the sets alternating in a circumferential direction in the expanded deck, such that a pair of segments of said first set lie immediately circumferentially adjacent, and on opposite circumferential sides respectively of each segment of the second set and vice-versa, the axially extending edges of the segments of said second set each including a circumferentially extending protrusion which underlies the deck surface of the adjacent segment of the first set, whereby the expanded segments interlock to resist radial loading on the deck in a direction to collapse the deck.

Preferably, the axially extending edges of the segments also include surfaces which abut in the fully expanded position of the deck segments to interlock the segments against relative axial movement. Conveniently, a drive arrangement, including said linkage arrangements, for driving said segments between their collapsed and expanded positions is arranged to ensure that the segments of the first set reach their fully expanded position in advance of the segments of the second set, whereby the segments of the second set enter between the fully expanded segments of the first set so that the segments interlock in the fully expanded position of all of the segments.

In accordance with a second aspect of the present invention, there is provided a tire building drum comprising a rotatable hub assembly, a plurality of deck segments supported from the hub assembly through the intermediary of respective linkage arrangements for expanding and contracting movement between a collapsed position, in which the drum has a relatively small overall diameter, and an expanded position, in which the deck segments define a cylindrical tire building deck of the drum of significantly larger overall diameter. The deck segments comprise first and second sets of segments, the segments of the sets alternating in a circumferential direction in the expanded deck, such that a pair of segments of the first set lie immediately circumferentially adjacent, and on opposite circumferential sides respectively of, each segment of the second set, and vice-versa. The drum incorporates a drive arrangement, including the linkage arrangements, for driving the segments between their collapsed and expanded positions, the drive arrangement ensuring that the segments of the first set reach their fully expanded position in advance of the segments of the second set, whereby during drum expansion the segments of the second set enter between the fully expanded segments of the first set.

Preferably, in either aspect, the drive arrangement ensures that the segments of the second set commence their collapsing movement from the fully expanded position prior to the commencement of the collapsing movement of the segments of the first set. Desirably, in either aspect, the drive arrangement includes a common drive member for driving all of the linkage arrangements of the segments of the first and second sets, and a lost motion arrangement is incorporated between the drive member and the linkage arrangements of the segments of the first set, whereby the drive member can continue to move, driving the linkage arrangements of the segments of the second set, after the segments of the first set have reached their fully expanded position. Preferably, in either aspect, in the fully collapsed position of the segments, the axially extending edges of the segments of the first set are closely proximate one another, and the segments of the second set lie radially inwardly and beneath the segments of the first set.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

In accordance with several features of the present general inventive concept, a tire building drum having sequenced segment expansion is disclosed. The tire building drum having sequenced segment expansion, or "drum," provides a radially expandable and contractible deck surface upon which at least one task for construction of a radial tire may be completed. Referring to the drawings, and with reference to FIG. 1, one embodiment of a drum is illustrated generally at 10. In the illustrated embodiment of FIG. 1, the drum 10 is a tire shaping drum of the type including first and second segmented circular mandrels A, B, each of which defines a circular beadlock for engaging a reinforcing bead of the tire carcass. The mandrels A, B are mounted in a coaxial arrangement along a hollow, rotatable central shaft 2 of the drum 10 and are movable along the central shaft 2 toward and away from one another. The various segments forming the beadlock portion of the mandrels A, B are further radially expandable and collapsible to allow for placement of a tire carcass (not shown) over the drum 10 and to allow for removal of an expanded green tire and/or a finished tire therefrom. However, it will be recognized that other tire building drums may be used without departing from the spirit and scope of the present general inventive concept. Furthermore, it will be recognized that various types of tire building drums can exhibit various degrees of mechanical complexity dependent upon the stage or stages of tire building which the drum is to facilitate.

Figure 1:
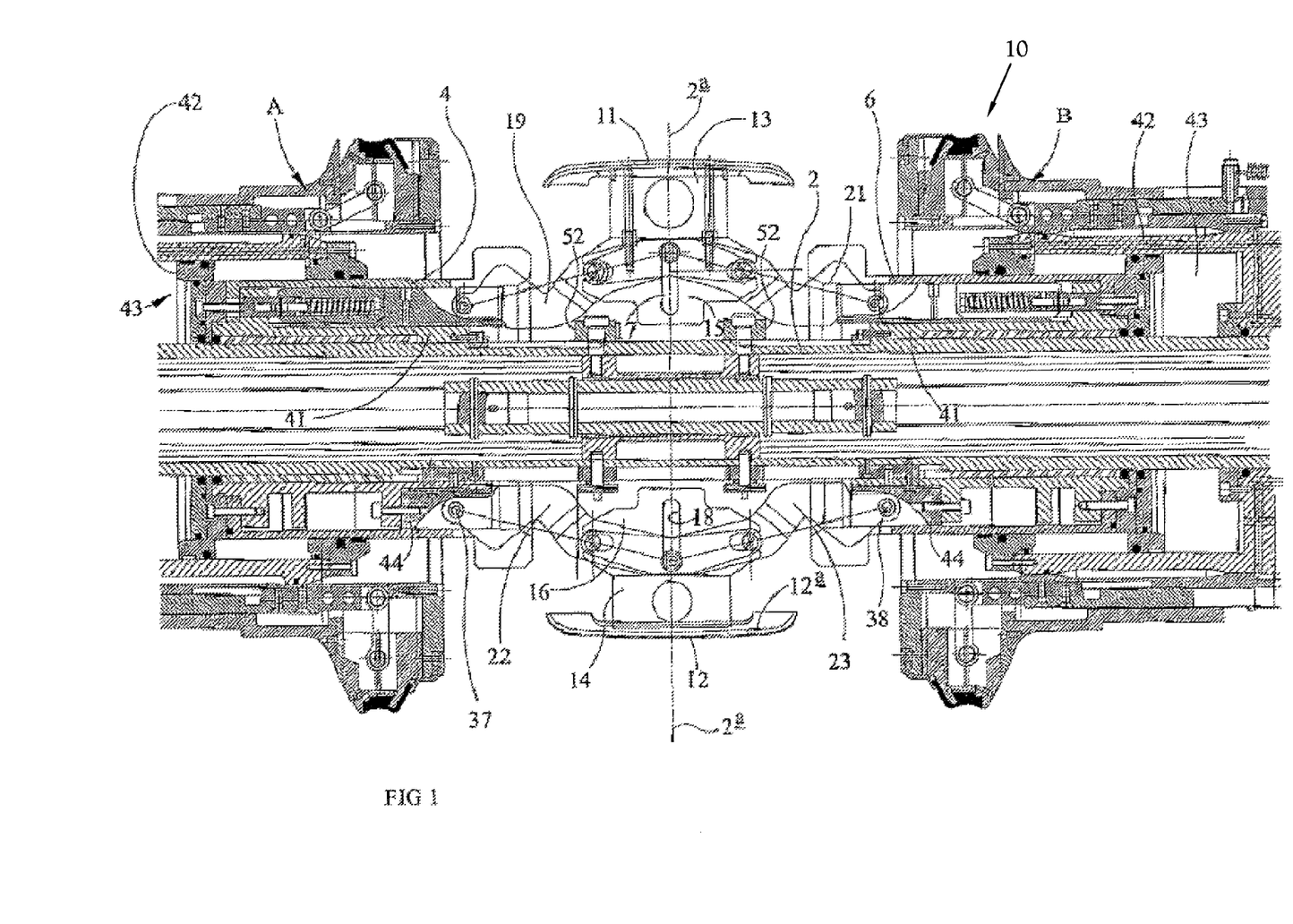
FIG. 1 is a diagrammatic cross-sectional view of part of a tire building drum showing the deck segments thereof in a collapsed position
Figure 2:
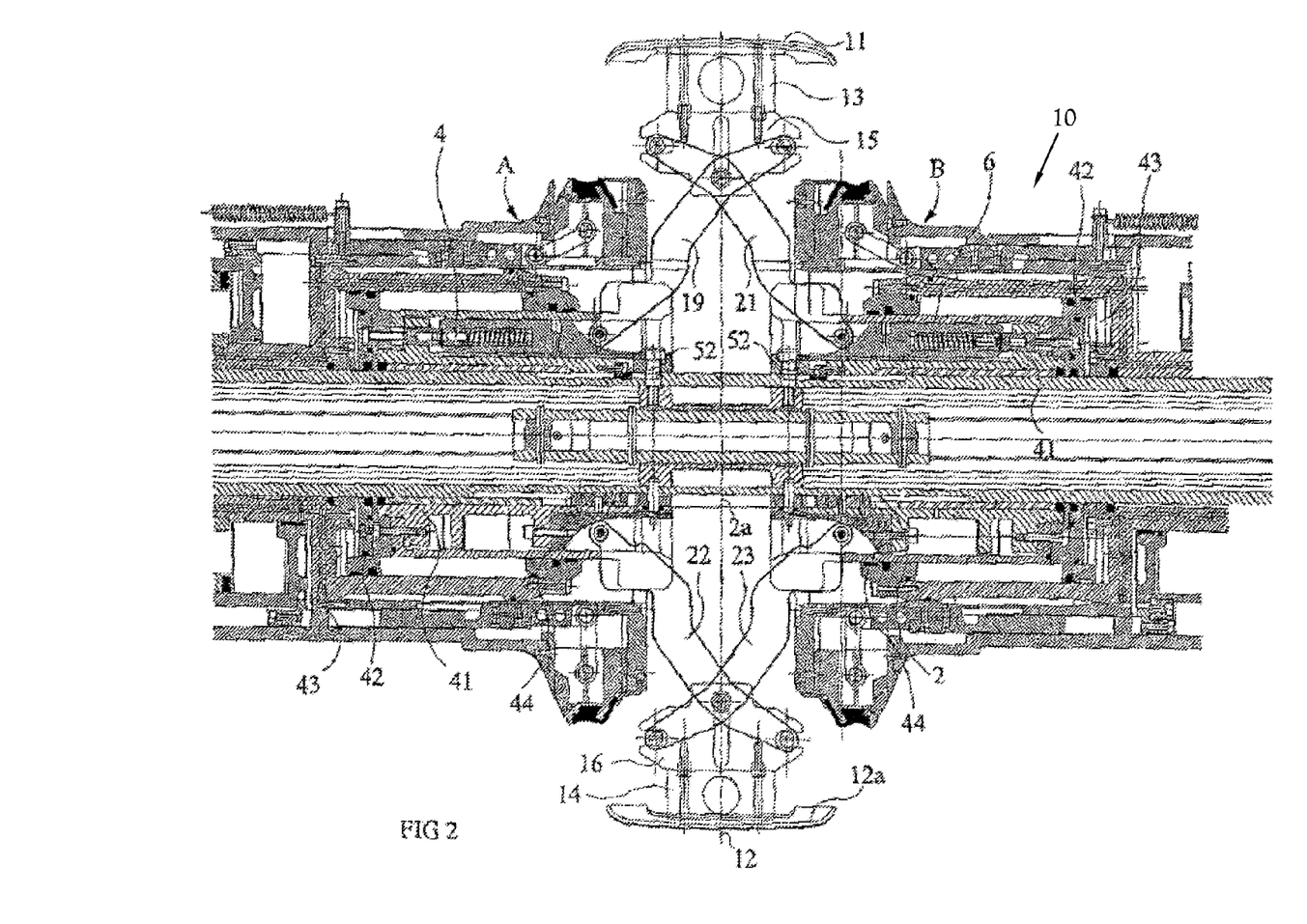
FIG. 2 is a view similar to FIG. 1 showing the deck segments in an expanded position.
Figure 3:
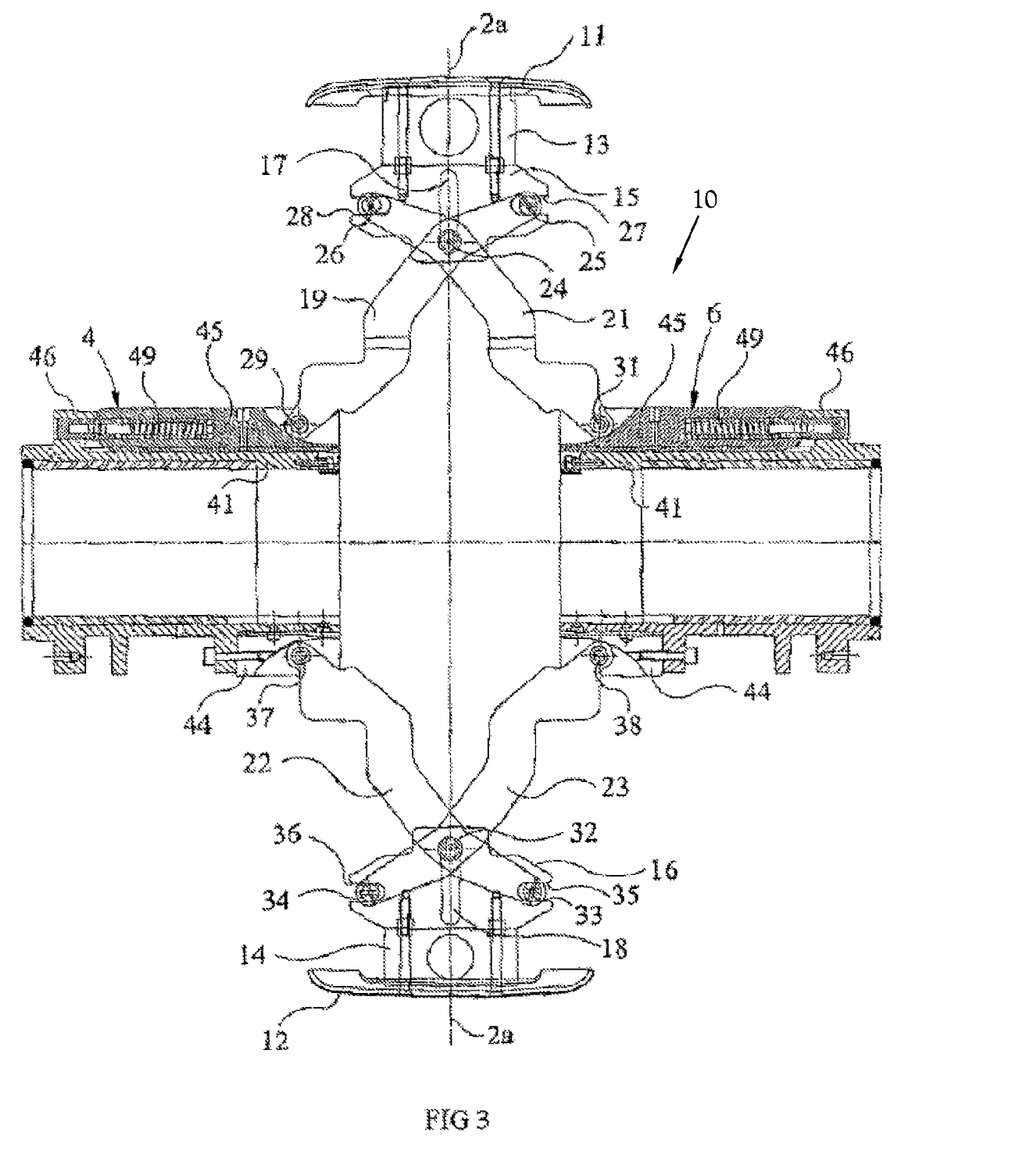
FIG. 3 is a view similar to FIG. 2 but illustrating only the components directly involved in movement of the deck segments.

With reference to FIGS. 1-5, in accordance with several features of the present general inventive concept, a plurality of circumferentially alternating deck segments 11, 12 are provided between the mandrels A, B of the drum 10 to define a generally cylindrical and/or toroidal deck upon which a tire, or part of a tire carcass, can be formed and/or constructed. The segments 11 and 12 are capable of being collapsed to produce a smaller diameter assembly to release the tire, or carcass, for axial removal from the drum. More specifically, in the illustrated embodiment, the elongate hollow rotatable shaft 2 of the drum 10 has slidably mounted thereon a hub assembly consisting of first and second axially spaced hub units 4, 6, each hub unit 4, 6, being mounted substantially adjacent and interior of a corresponding mandrel A, B. The hub units 4, 6 of the hub are effectively mirror-images of one another about a transverse median plane 2a of the shaft 2 and the drum 10, and are moved in unison relative to the shaft 2 axially towards and away from the median plane 2a of the drum 10. Both hub units 4, 6 rotate with the shaft 2, and axial movement of the hub units 4, 6 towards and away from the median plane of the shaft 2 serves to move the segments 11, 12 between a collapsed position (FIGS. 1 and 5) and first and second expanded positions (FIGS. 2 and 3).

When comparing FIGS. 1, 2 and 3 of the accompanying drawings, it must be recognized that while FIGS. 1 and 3 are approximately to the same scale, FIG. 2 is drawn to a slightly smaller scale. Moreover, when comparing FIGS. 1 and 2 it can be seen that the mandrels A and B of the drum have moved axially of the drum in FIG. 2 by comparison with their positions in FIG. 1.

Figure 4:
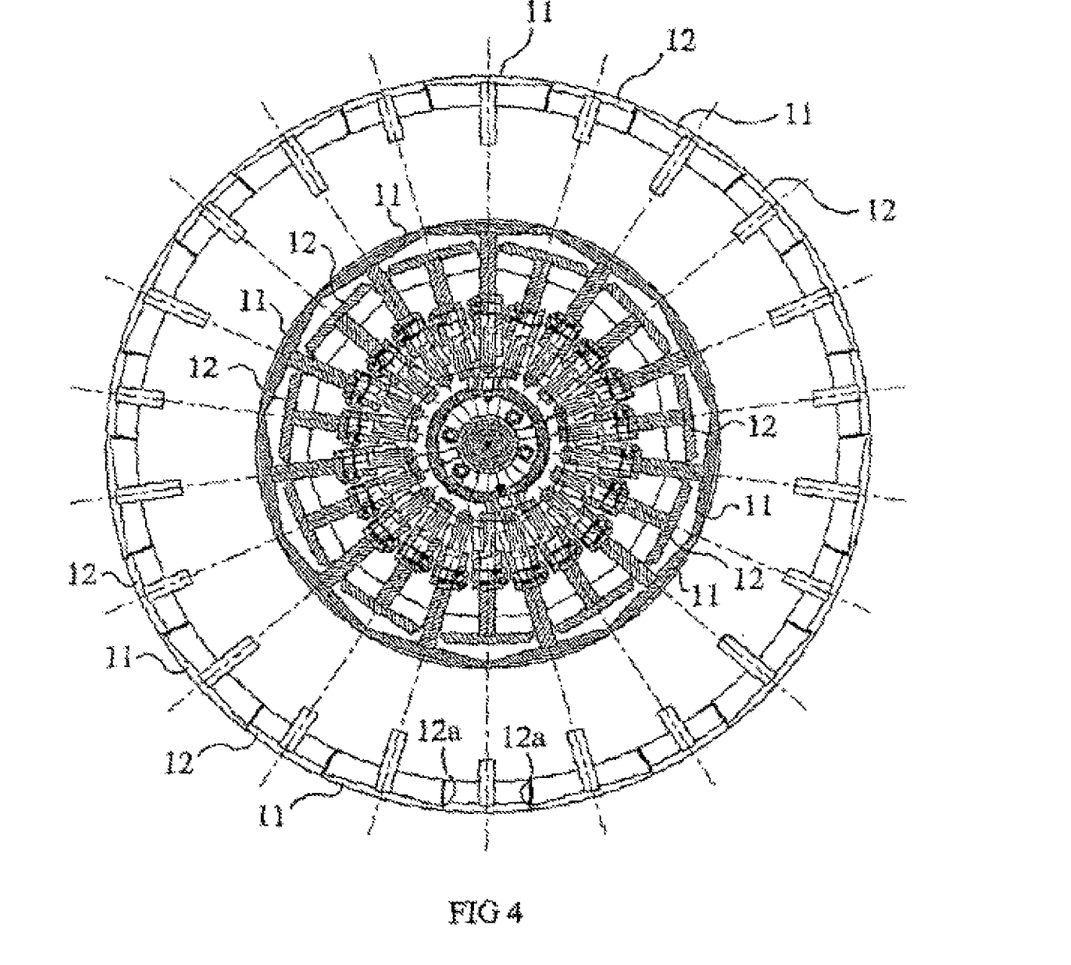
FIG. 4 is a composite transverse cross-sectional view of the tire building drum showing the segments (hatched) in a collapsed position and also illustrating (in full lines) the segments in an expanded position.

FIG. 4 shows the segments 11, 12 collapsed (in hatched lines), and expanded (in full lines). As is apparent from FIG. 4, the circumferentially alternating segments 11, 12 comprise two distinct sets of segments, there being circumferentially long segments 11 interposed between adjacent circumferentially short segments 12. However, it will be recognized from FIGS. 1, 2 and 3 that although the circumferential dimension of the segments 11, 12 is different, the axial dimension and the cross-sectional shape in an axial direction of both the segment types is at least approximately the same. Referring to FIG. 4, each of the short segments 12 has, along both axial edges, a protruding lip 12a which may, in some embodiments, be formed by machining away part of the outer surface of the short segment to define a step. Thus, the surface of the lip 12a lies beneath the level of the deck surface of its respective short segment 12. The long segments 11 have, along their axial edges, corresponding recesses for receiving the lips 12a of the short segments 12 so that in the fully expanded drum the segments 11, 12 abut circumferentially and interlock with one another to resist radial collapsing movement under radial loads applied to the deck. Also, by virtue of the curvature of the segments in an axial direction, the interlocking segment formations resist relative axial movement between adjacent segments.

It can be seen that each segment 11, 12 has a shaping such that in the expanded positions of the drum 10 (FIGS. 2 and 3) the deck surface of each of the segments 11, 12 forms part of the deck surface of the drum 10. It will be understood that the exact shaping of the deck surface is determined at least in part by the nature of the tire being built. Thus, when viewed in axial cross-section, as in FIGS. 1-3 and 5, the segments 11, 12 may be long and relatively flat, with a gentle curvature in their mid-region and more steeply curving axial end regions where, for example, an automotive tire is being constructed. Alternatively, the segments 11, 12 may be much more steeply curved where, for example, a motor cycle tire or bicycle tire is being constructed. In several embodiments, the segments 11, 12 may be conveniently formed by casting from an appropriate alloy, the casting subsequently being machined to give the final surface shape and profile.

Referring now to FIGS. 1-3, each segment 11, 12 is secured to a respective spacer block 13, 14. Each spacer block 13, 14 lies beneath a respective segment 11, 12 and is secured thereto by respective screws having countersunk heads which are received within countersunk apertures in the deck surface of the respective segment. Each spacer block 13, 14 is anchored on top of a respective carrier plate 15, 16, and the screws securing the segments 11, 12 to their respective blocks 13, 14 extend through the blocks and into the respective carrier plates 15, 16 to produce a rigid assembly of segment, spacer block, and carrier plate. The carrier plates are generally planar, and are disposed in planes containing, and extending radially outwardly from, the axis of rotation of the shaft 2. Each carrier plate 15, 16 has an elongate, radially extending slot 17, 18, the slots 17, 18 having their center lines on the median plane of the shaft 2.

The carrier plates 15 of the long segments 11 are substantially identical to the carrier plates 16 of the short segments 12, but may include minor dimensional differences to facilitate an operative motion of the short segments 12 which differs slightly from that of the long segments 11, as will be discussed in further detail below. Each long segment 11 and its respective block 13 and carrier plate 15 constitute a rigid sub-assembly mounted for radial movement relative to the shaft 2 through the intermediary of first and second pivoting links 19, 21. Similarly, each short segment 12 and its spacer block 14 and carrier plate 16 constitute a rigid sub-assembly mounted for radial movement relative to the shaft 2 through the intermediary of third and fourth pivoting links 22, 23.

The first and second pivoting links 19, 21 are identical, but are oppositely orientated. The first and second pivoting links 19, 21 are pivotally interconnected intermediate their ends by a pivot pin 24 which is also slidably received in the slot 17 of the respective carrier plate 15 of a corresponding long segment 11. The outermost end of each of the first and second pivoting links 19, 21 is pivotally connected, by way of a respective pivot pin 25, 26 to the respective carrier plate 15 of a corresponding long segment 11 on opposite sides respectively of the slot 17. The pivot pins 25, 26 are received within axially extending slots 27, 28 in the carrier plate 15, the slots 27, 28 having a common axial center line parallel to the axis of the shaft 2. At their opposite, innermost ends the first and second pivoting links 19, 21 are pivotally connected by means of pivot pins 29, 31 to the axially movable hub units 4, 6 respectively.

Similarly the third and fourth pivoting links 22, 23 are pivotally interconnected intermediate their ends by a pivot pin 32 slidably received in the slot 18 of the respective carrier plate 16 of a corresponding short segment 12. The outermost ends of the third and fourth pivoting links 22, 23 are pivotally connected to the respective carrier plate 16 of a short segment 12 by pivot pins 33, 34 received in axial slots 35, 36 respectively in the respective carrier plate 16 of a corresponding short segment 12. The innermost ends of the third and fourth pivoting links 22, 23 are pivotally connected by means of pivot pins 37, 38 to the hub assemblies 4, 6 respectively. The third and fourth pivoting links 22, 23 are closely similar to the first and second pivoting links 19, 21, differing in minor respects to effect minor differences between the movement geometry of the long and short segments 11 and 12. It will be recognized therefore that movement of the hub units 4, 6 in unison towards the median plane of the shaft 2 causes the links 19, 21 and 22, 23 simultaneously to perform a scissor-like action moving the respective carrier plates 15, 16 radially outwardly from the axis of the shaft 2 carrying the associated deck segments 11, 12 with them. Similarly, movement of the hub units 4, 6 in unison away from the median plane of the shaft 2 retracts the deck segments 11, 12 towards the axis of the shaft 2.

Figure 5:
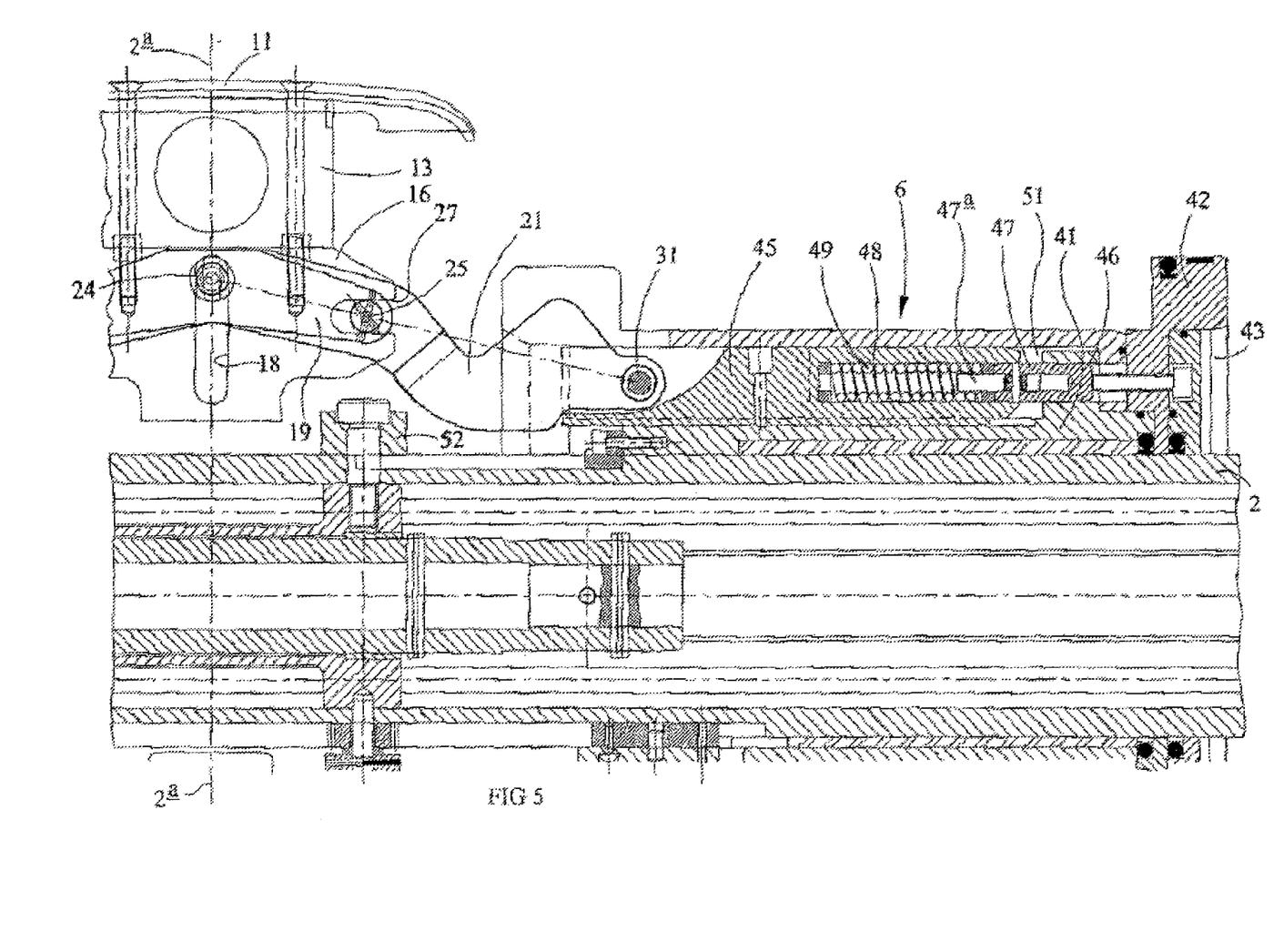
FIG. 5 is an enlargement of part of FIG. 1.

FIG. 5 is a partial cross-sectional illustration showing a closer view of one side of the drum 10. Referring to FIG. 5, each hub unit 4, 6 includes an elongate sleeve 41 mounted for sliding movement on the shaft 2. At its axially outermost end remote from the median plane of the shaft 2, each sleeve 41 is secured to an annular piston head 42 slidable within a cylinder 43 of the tire building drum. Simultaneous admission of hydraulic or pneumatic fluid under pressure to the cylinders 43 drives the assembly of the sleeve 41 and piston head 42 towards the median plane 2a of the shaft 2. The third and fourth pivoting links 22, 23 of the small deck segments 12 are pivotally mounted, at their inner ends, by way of the pivot pins 37, 38 in respective guide grooves of respective first bearing blocks 44 anchored directly to the respective sleeve 41. The inner ends of the first and second pivoting links 19, 21 of the large deck segments 11 are pivotally connected by the pivot pins 29, 31 in guide grooves of respective second bearing blocks 45. However, whereas the first bearing blocks 44 are secured directly to their respective sleeve 41, the second bearing blocks 45 are slidable through a small, permitted, range of axial movement relative to their respective sleeve 41.

It will be understood that, just as the long and short deck segments 11, 12 are disposed in a circumferentially alternating configuration about the central shaft 2, the first and second bearing blocks 45, which correspond to short and long deck segments 12, 11, respectively, are disposed in a circumferentially alternating configuration about the corresponding sleeves 41 of the drum 10. As is apparent from FIG. 5, each sleeve 41 has a plurality of radially outwardly projecting, circumferentially spaced integral lugs 46, each of which acts as an anchor for an axially extending elongate guide pin 47 which extends axially into a corresponding axially extending bore 48 in a respective second bearing block 45. Housed within each bore 48 is a compression spring 49 acting at one end against the closed end of the bore 48 and acting at its opposite end against the guide pin 47. A protrusion 47a of the guide pin 47 extends into the spring 48 to ensure alignment of the spring 48 and the guide pin 47. The spring 49 urges the second bearing block 45 to assume a rest position in which the axially outermost end of the second bearing block 45 is spaced by a clearance 51 (FIG. 5) from the respective lug 46. Thus if the piston head 42 and sleeve 41 are driven towards the median plane of the shaft 2, but the second bearing block 45 is held against axial movement, then the sleeve 41 will move relative to the second bearing block 45, compressing the spring 49 and taking up the clearance 51 while simultaneously maintaining the associated long segment 11 in its radial position with respect to the central shaft 2. By contrast, holding the first bearing block 44 against axial movement and/or holding the associated short segment 12 against radial movement in relation to the central shaft 2 limits axial movement of the sleeve 41 in relation to the central shaft 2.

Figure 6:
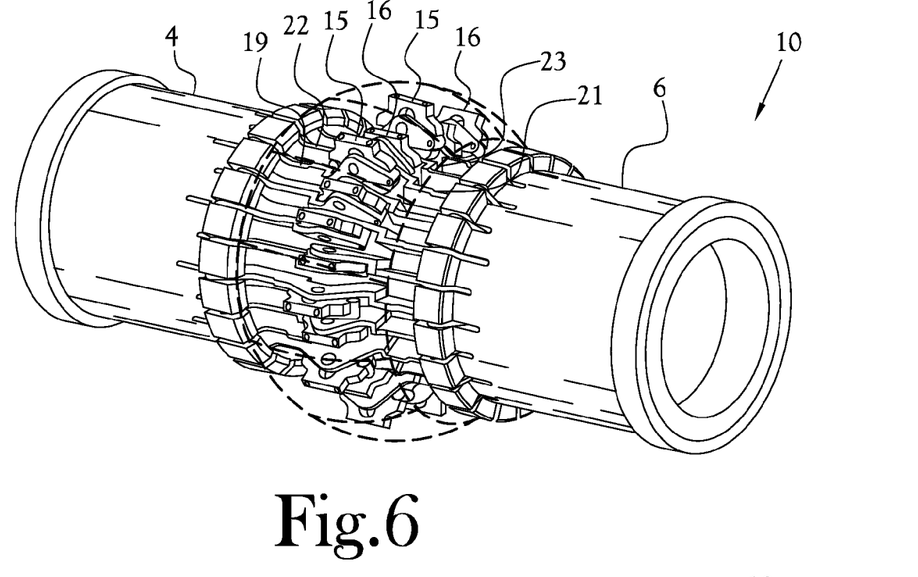
FIG. 6 is a perspective view showing the hub unit, scissor linkage, and carrier plate portions of the tire building drum of FIG. 1 in the collapsed position.

As illustrated in FIGS. 1 and 6, in the collapsed position of the drum 10, the hub units 4, 6 are retracted away from the median plane of the shaft 2, which may be conveniently accomplished by the application of hydraulic or pneumatic pressure to the piston heads 42 on their faces opposite the face exposed to their respective pressure cylinder 43. In this position, each of the springs 49 is fully extended so that the clearances 51 exist between each of the second bearing blocks 45 and their respective lugs 46. In this position, the deck segments 11, 12 are collapsed to the positions shown in hatched lines in FIG. 4, in which the axial edges of the long segments 11 are brought together and the short segments 12 are received beneath the larger deck segments 11, that is to say, are disposed radially inwardly therefrom.

In order to expand the drum to provide the large diameter cylindrical deck upon which the tire is built, pressure is applied to the cylinders 43 of both hub units 4, 6 to drive the sleeves 41 towards the median plane of the shaft 2. The springs 49 are sufficiently strong to act as substantially rigid spacers during this part of the movement of the sleeves 41, and so the first and second pivoting links 19, 21 and the third and fourth pivoting links 22, 23 are moved in unison and pivot to displace their respective deck segments 11, 12 radially outwardly. It will be recognized that, because the short segments 12 were below the long segments 11 in the collapsed position of the drum 10, during the simultaneous radial outward movement of the segments 11 and 12 the short segments 12 lag radially behind the long segments 11.

Figure 7:
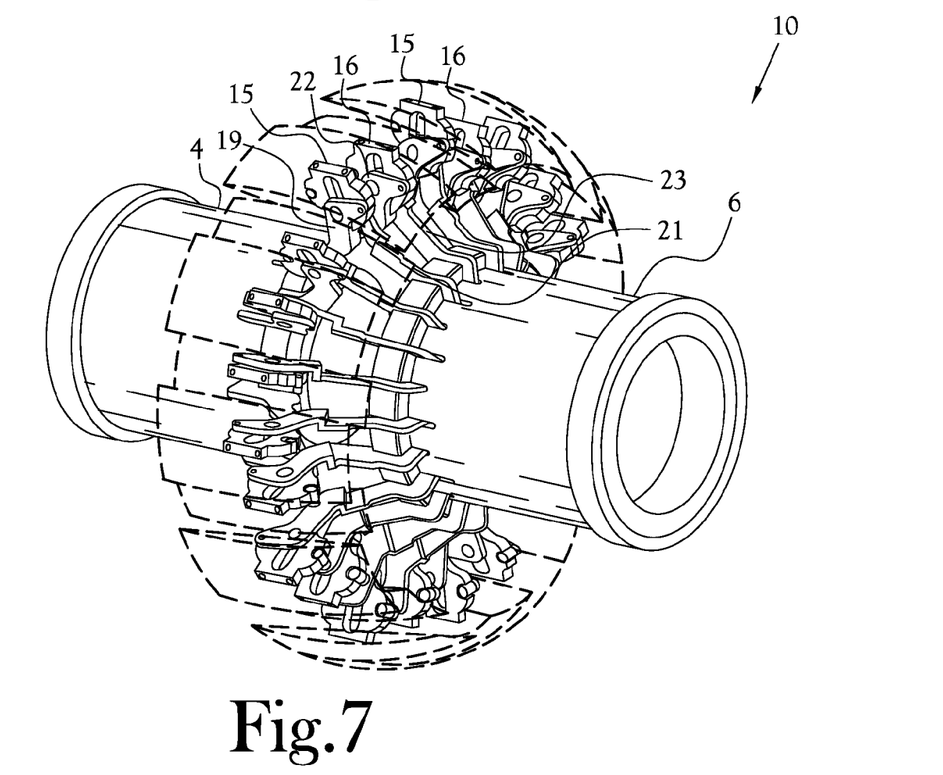
FIG. 7 is a perspective view showing the hub unit, scissor linkage, and carrier plate portions of the tire building drum of FIG. 6 in in a partially-expanded position.
Figure 8:
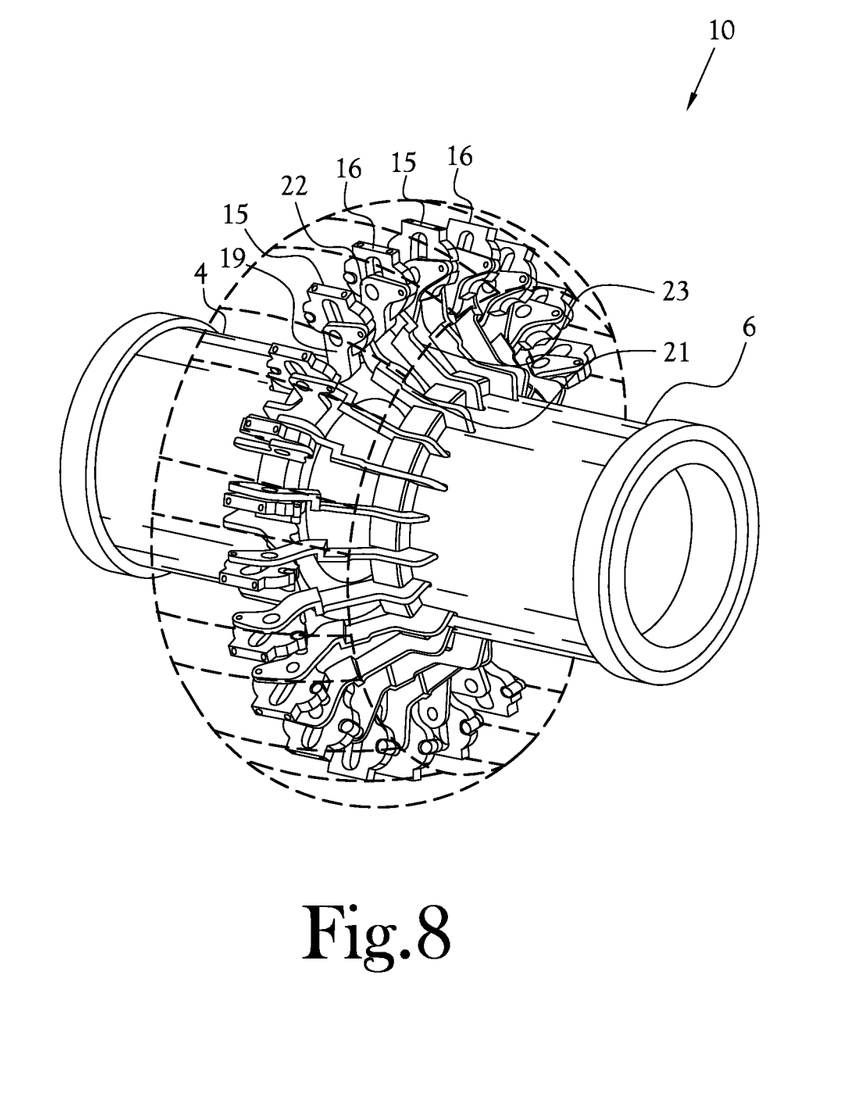
FIG. 8 is a perspective view showing the hub unit, scissor linkage, and carrier plate portions of the tire building drum of FIG. 7 in in a fully-expanded position.

It will be recognized that each sleeve 41 carries alternating first bearing blocks 44, which are fixed thereto, and second bearing blocks 45 which are slidably mounted theron. The bearing blocks 44 and 45 are positioned alternately around the circumference of their respective sleeve 41. In the illustrated embodiment, the shaft 2 carries abutments 52 against which the bearing blocks 45 can engage to define the limit of movement of the bearing blocks 45 towards the median plane of the shaft 2, and thus to limit radial expansion of the large deck segments 11. Because, in the collapsed position of the drum 10, the second bearing blocks 45 are offset axially inwardly by the springs 49, there is a greater axial spacing in the collapsed position of the drum 10 between the first bearing blocks 44 and the abutments 52 than exists between the second bearing blocks 45 and the abutments 52. Thus, as is illustrated in FIGS. 2 and 7, during movement of the drum 10 toward the expanded position, as the sleeves 41 are brought toward the median plane of the shaft 2, the second bearing blocks 45 are each brought into engagement with the abutments 52, thereby holding the second bearing blocks 45 against further axially inward movement and limiting further expansion of the long deck segments 11. After engagement of the bearing blocks 45 with the abutments 52, whereby the expanded position of the larger deck segments 11 has been achieved, the sleeves 41 can continue to move toward the median plane 2 of the drum 10, for example under the action of the pressure in the cylinders 43, against the action of the springs 49, thereby taking up the clearances 51 between the second bearing blocks 45 and the lugs 51 of the sleeves 41 and allowing the shorter deck segments 12 to continue to expand. Thus, as is illustrated in FIGS. 3 and 8, with the second bearing blocks 45 held against further axially inward movement and the long segments 11 at their fully expanded position, the first bearing blocks 44 continue to move axially inward with the sleeves 41, so that the short segments 12 continue to move radially outwardly to enter and occupy the spaces between circumferentially adjacent long segments 11.

As the short segments 12 move into position between the long segments 11, the lips 12a of the short segments 12 engage the undercut areas of the long segments 11 so that the segments 11,12 interlock, thereby allowing the segments 11, 12 to resist radial forces on the outer deck surface of the drum 10 and to resist lateral forces tending to move the segments 11, 12 axially of the drum relative to one another. The movement of the short segments 12 ceases when the short segments 12 interlock with the long segments 11, and simultaneously the bearing blocks 44 engage the abutments 52.

Those skilled in the art will recognize variations in the apparatus and configurations which may be used to accomplish the above-discussed expansion and contraction of the drum 10 discussed above without departing from the spirit and scope of the present general inventive concept. For example, in another embodiment, the limits of radially outward movement of the various pivoting links 19, 21, 22, 23 are defined by the bounds of the slots 17, 18 of their associated carrier plates 15, 16, rather than by the position of the abutments 52 along the sleeves 41. In other embodiments, the limits of radially outward movement of the first and second pivoting links 19, 21 may be defined either by the position of the abutments 52 along the sleeves 41 or by the bounds of the slots 17 of their associated carrier plates 15, while the limits of radially outward movement of the third and fourth pivoting links 22, 23 may be defined by receipt of the short segments 12 between associated adjacent long segments 11. Those skilled in the art will recognize other variations which may be used without departing from the spirit and scope of the present general inventive concept.

Referring again to FIGS. 3 and 8, in the fully expanded position of the drum, the clearances 51 are almost completely absorbed, and the springs 49 are in compression. Thus, when the sleeves 41 are moved away from one another, which may in the present embodiment be accomplished by applying pressure to the opposite faces of the pistons 42, then initial movement of the sleeves 41 away from the median plane of the shaft 2 takes place without corresponding movement of the second bearing blocks 45. Instead, the springs 49 expand to re-establish the clearances 51 between the second bearing blocks 45 and the lugs 46. However, the first bearing blocks 44 move immediately and so the short deck segments 12 start their collapsing movement before the collapsing movement of the long deck segments 11 commences. Thus the short deck segments are withdrawn radially inwardly from between the long deck segments 11 permitting the long deck segments thereafter to commence their collapsing movement.

It will be recognized that the drum construction described above, in which a lost motion arrangement is provided to allow the short segments 12 to be received between and beneath the long segments 11, to lag behind the long segments 11 during expansion of the drum 10, but still to be driven radially into their fully expanded position between the long segments 11 after the long segments 11 have reached their fully expanded position, permits the construction of a drum in which there can be little or no clearance between adjacent segments in the fully expanded position of the deck. This in turn achieves a very high degree of lateral and radial deck stability and accuracy which is extremely beneficial in the accurate manufacture of tires. Furthermore, a large range of movement between fully expanded and fully collapsed positions is obtained by virtue of this drum construction, and this in turn allows the drum to be used in the manufacture of a large range of different tires, using different segment profiles and spacer block dimensions. Furthermore, deck segments 11, 12 and spacer blocks 13, 14 can be changed relatively easily, without disassembly of the remainder of the drum.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A tire building drum comprising:
   a central shaft extending along an axial dimension of said tire building drum;
   a pair of opposing hub units surrounding said central shaft and movable along said axial dimension toward and away from one another;
   a plurality of first scissor linkages disposed in a radial configuration about said central shaft, each of said first scissor linkages comprising first and second links, each first link having a first end pivotally and slidably mounted to one of said pair of hub units, each second link having a first end pivotally and slidably mounted to the other of said pair of hub units, said first and second link first ends being biased toward a median plane of said central shaft, whereby movement of said hub units toward one another through a first range of motion of said hub units moves respective second ends of each said first and second links radially outwardly from said central shaft to a radially outward limit of movement of said first scissor linkages, and movement of said hub units toward one another through a second range of motion of said hub units causes slidable movement of said first ends of each of said first and second links in relation to said hub units absent radially outward movement of said second ends of each of said first and second links;
   a plurality of second scissor linkages disposed in an alternating configuration between said first scissor linkages about said central shaft, each of said second scissor linkages comprising third and fourth links, each third link having a first end pivotally connected to one of said pair of hub units and each fourth link having a first end pivotally connected to the other of said pair of hub units, whereby movement of said hub units toward one another through said first and second ranges of motion of said hub units moves respective second ends of each said third and fourth links radially outwardly from said central shaft;
   a plurality of first deck segments, each said first deck segment supported by one of said first scissor linkages and disposed radially outwardly of said corresponding linkage; and
   a plurality of second deck segments, each said second deck segment supported by one of said second scissor linkages and disposed radially outwardly of said corresponding linkage;
   whereby when said hub units are separated from one another, said second deck segments are disposed radially inwardly of and between said first deck segments, whereby movement of said hub units toward one another through said first range of movement of said hub units expands said first deck segments to an expanded diameter of said tire building drum, and whereby movement of said hub units toward one another through said second range of movement of said hub units expands said second deck segments to allow said second deck segments to be received between said first deck segments.

2. The tire building drum of claim 1, each of said first and second deck segments being supported by a respective carrier plate mounted radially inwardly of said respective segment and extending in a plane containing, and extending radially outwardly from, a central axis of said central shaft.

3. The tire building drum of claim 2, each said second end of said first and second scissor linkages being pivotally connected to one of said carrier plates.

4. The tire building drum of claim 3, each said first scissor linkage including a first pivot pin pivotally connecting said first and second pivoting links intermediate respective ends of said first and second pivoting links, and each said second scissor linkage including a second pivot pin pivotally connecting said third and fourth pivoting links intermediate respective ends of said third and fourth pivoting links.

5. The tire building drum of claim 4, each said carrier plate defining an elongate, radially extending slot, each said slot having a center line disposed along said central shaft median plane.

6. The tire building drum of claim 5, each said first pivot pin being slidably received in said slot of said carrier plate associated with said first scissor linkage, and each said second pivot pin being slidably received in said slot of said carrier plate associated with said second scissor linkage.

7. The tire building drum of claim 6, each said carrier plate slot having a length dimension defining a range of permissible movement of said associated linkage.

8. The tire building drum of claim 7, each said first end of said first and second links being pivotally mounted to a bearing block, each said bearing block being slidably mounted to said associated hub unit along said axial dimension.

9. The tire building drum of claim 8, each said bearing block defining a bore extending along said axial dimension, each said bore having a compression spring received therein, said compression spring acting at one end thereof against a closed interior end of said bore and acting at an opposite end thereof against a guide pin mounted to said associated hub unit.

10. The tire building drum of claim 9, each of said first and second deck segments having a circumferential dimension, said circumferential dimension of each first deck segment being longer than said circumferential dimension of each second deck segment.

11. The tire building drum of claim 10, each second deck segment defining a pair of protruding lips extending along opposite axial edges of said second deck segment radially inwardly of an outer surface of said second deck segment.

12. The tire building drum of claim 11, each first deck segment defining a pair of recesses extending along opposite axial edges of said first deck segment radially inwardly of an outer surface of said first deck segment, each recess being sized and shaped to abut circumferentially and interlock with an adjacent lip of an adjacent second deck segment.

13. The tire building drum of claim 1, each of said first and second deck segments having a circumferential dimension, said circumferential dimension of each first deck segment being longer than said circumferential dimension of each second deck segment.

14. The tire building drum of claim 13, each second deck segment defining a pair of protruding lips extending along opposite axial edges of said second deck segment radially inwardly of an outer surface of said second deck segment.

15. The tire building drum of claim 14, each first deck segment defining a pair of recesses extending along opposite axial edges of said first deck segment radially inwardly of an outer surface of said first deck segment, each recess being sized and shaped to abut circumferentially and interlock with an adjacent lip of an adjacent second deck segment.

* * * * *